United States Patent [19]

Fukuoka

[11] Patent Number: 4,947,091
[45] Date of Patent: Aug. 7, 1990

[54] DEVICE FOR PREVENTING A COIL OF A BRUSHLESS MOTOR FROM BURNING

[75] Inventor: Toshiaki Fukuoka, Yonago, Japan

[73] Assignee: Matsushita Electric Industrial Co., Ltd., Osaka, Japan

[21] Appl. No.: 428,690

[22] Filed: Oct. 30, 1989

[30] Foreign Application Priority Data

Oct. 31, 1988 [JP] Japan ................. 63-274827

[51] Int. Cl.$^5$ .............................. H02H 7/08
[52] U.S. Cl. .................... 318/434; 318/138; 318/254
[58] Field of Search .......... 318/138, 254, 434, 439; 361/23, 24, 30, 31

[56] References Cited

U.S. PATENT DOCUMENTS

| | | | |
|---|---|---|---|
| 3,644,808 | 2/1972 | Favre | 318/138 |
| 3,719,875 | 3/1973 | Holland et al. | 318/439 X |
| 4,030,005 | 6/1977 | Doemen | 318/138 |
| 4,504,881 | 3/1985 | Wada et al. | 318/434 X |
| 4,553,187 | 11/1985 | Burns et al. | 361/31 X |
| 4,578,623 | 3/1986 | Tsukutani et al. | 318/254 |
| 4,818,924 | 4/1989 | Burney | 318/434 X |

Primary Examiner—Bentsu Ro
Attorney, Agent, or Firm—Panitch, Schwarze, Jacobs & Nadel

[57] ABSTRACT

A device for preventing a coil of a brushless motor from burning is disclosed. The device comprises: a first discharge transistor for discharging a capacitor when receiving a pulse signal which is generated in synchronization with the rotation of the motor; a control circuit for deactivating an output circuit for energizing a coil of the motor, when the voltage level of the capacitor is raised to a first predetermined level, and for activating the output circuit when the voltage level of the capacitor is lowered to a second predetermined level (the second predetermined level is lower than the first predetermined level); a detecting transistor which is ON when the voltage level of the capacitor is higher than a third predetermined level (the third predetermined level is higher than the first predetermined level); a circuit which has a first state and a second state, and changes its state from the first state to the second state when the detecting transistor is ON; and a second discharge transistor for discharging the capacitor when the circuit is in the second state.

4 Claims, 4 Drawing Sheets

DEVICE FOR PREVENTING A COIL OF A BRUSHLESS MOTOR FROM BURNING

BACKGROUND OF THE INVENTION

1. Field of the Invention

The present invention relates to a device for protecting a coil of a brushless motor against thermal damage, and more particularly, to a device for preventing a motor coil from burning in case the motor rotation stops due to some cause.

2. Description of the Prior Art

In recent years, applications of small DC motors have been expanding at a very rapid pace not only in the audio industry but also in the information industry because of their excellent controllability. Among them, because of the elimination of mechanically contacting parts such as a brush or commutators and the advantage of longer life, brushless motors are finding increasing applications as industrial motors which require particularly high reliability.

Because of this, DC power has been replacing AC power as the driving source for small axial fans over the past few years, and DC axial fans using a brushless motor have come to be used in increasing numbers.

Also, as industrial apparatuses such as computer-controlled apparatuses have come to be constructed in a higher packaging density, there has been an increasing need for DC axial fans for forced-air ventilation use, along with increasing requirements for higher reliability of such fans in themselves. That is, in case a motor stops due to some cause, it is required not only that the motor coil be protected against thermal damage, but also that a possible accident be prevented by issuing some kind of warning to the control unit of the apparatus, while the apparatus should be automatically reset to restart the motor for proper rotation after the cause has been removed. Therefore, it is usual to provide such an apparatus with a device for preventing a coil of a motor from burning.

FIG. 3 shows a conventional device for preventing a coil of a DC axial fan motor from burning. If the motor stops due to an external cause or continues to run at a slow speed with overload, a motor coil 4 will burn out, and the motor will no longer function properly. In order to prevent such troubles, the device of FIG. 3 is constructed as described below to deactivate the output circuit 3 so that overcurrent will not flow through the coil 4.

The device of FIG. 3 comprises a magnetic flux detection unit 1, a position signal amplification circuit 2, an output circuit 3, and a rotation detection circuit 5. The magnetic flux detection unit 1 produces a position signal in accordance with the rotation of the rotor of the motor. The position signal is amplified by the position signal amplification circuit 2 to be supplied to both the output circuit 3 and the rotation detection circuit 5. When the line from the circuit 2 is HIGH, the output circuit 3 energizes the coil 4 of the motor. The rotation detection circuit 5 generates a rotation pulse signal synchronous with the motor rotation, in response to the signal fed from the position signal amplification circuit 2.

The device of FIG. 3 further comprises a constant-current circuit 46, a control circuit 47, a discharge circuit 48, and a capacitor 49. The constant-current circuit 46 is provided with a constant-current source 51, transistors 52 and 53, and a resistor 54, to constitute a current mirror circuit. The circuit 46 supplies a current f a constant value determined by the resistor 54 to the capacitor 49 which is connected to the collector of the transistor 53. The control circuit 47 is provided with resistors 55 and 56, a comparator 57, and a transistor 58 the collector of which is connected to an input 3a of the output circuit 3. The inverted input terminal of the comparator 57 is connected to $V_c$. The discharge circuit 48 has resistors 59 and 60 a comparator 61, and transistors 50 and 62. The base of the transistor 62 is connected to the output of the rotation detection circuit 5. The inverted input terminal of the comparator 61 is connected to voltage $V_d$. When the potential of the capacitor 49 rises to $V_c$, the output of the comparator 57 becomes HIGH, and the transistor 58 is ON to make the input 3a of the output circuit 3 LOW, thereby deactivating the output circuit 3. When the rotor of the motor rotates at a normal speed, the rotation detection circuit 5 supplies periodically a detection signal (period: $T_1$) to the transistor 62.

The operation of the device of FIG. 3 will be described with reference to FIG. 4 which illustrates the potential change of the capacitor 49. The transistor 62 is switched periodically by the rotation pulse signal to make the inverted input terminal LOW in synchronization with the rotation pulse signal, so that the capacitor 49 is periodically discharged by the transistor 50. In a normal rotation of the rotor, therefore, the potential of the capacitor 49 is prevented from rising up to the level $V_c(=V_{OFF})$ (curve A) so that rotor continues to turn.

On the other hand, when the motor stops due to an external cause, the rotation detection circuit 5 stops the generation of the rotation pulse signal, resulting in that the potential of the capacitor 49 continues to rise toward a point e. Upon the potential exceeding the point e, the output of the comparator 57 becomes HIGH to make the transistor 58 ON, by which the control circuit 47 is deactivated. When the potential further rises to reach a point f, i.e. $V_{ON}(=V_d)$, the output of the comparator 61 becomes HIGH to make the transistor 50 ON, so that the capacitor 49 is discharged to reduce its potential to a zero level. Then, the transistor 58 of the control circuit 47 is turned OFF to reset the output circuit 3 to energize the coil 4. At this time, if the external cause has been removed, the motor returns to the normal state of rotation, but if not, the potential of the capacitor 49 rises again to reach a point h to deactivated the output circuit 3 once again (curve C).

In the operation mentioned above, the charging characteristic is determined by the capacitance of the capacitor 49 and the level of the constant current supplied from the collector of the transistor 53. It is generally required to set the period of one cycle (O-e-f-g) to a few seconds. The period of a few seconds may be obtained by (a) selecting the level of the constant current to be considerably low, by (b) making the capacity of the capacitor 49 large, or by (c) setting the value of $V_{ON}$(or $V_d$) to be high. The way (a) requires the value of the resistor 54 to be in the order of a few megohms. It is not possible to contain such a resistor in an IC. On the other hand, when the way (b) or (c) is adopted, the discharge transistor 50 must have a larger current capacity, which causes the production cost to increase.

FIG. 5 illustrates the potential change of a capacitor in an improved device. When the motor rotates normally, this device operates in the same manner as the device of FIG. 3, i.e., the potential change follows the curve A. When the motor stops due to an external cause, the potential of the capacitor rises to a point i at which the output circuit is deactivated, while the capacitor is discharged. Then, the potential of the capacitor drops to a point j to activate again the output circuit (curve D). The problem with this device is that, since the output circuit remains energized until the potential of the capacitor reaches the point i, a discharge current flows in a very short period of time when the capacitor is discharged with the external cause removed, which therefore requires a discharge transistor of a large current capacity.

SUMMARY OF THE INVENTION

The device for preventing a coil of a brushless motor from burning of this invention, which overcomes the above-discussed and numerous other disadvantages and deficiencies of the prior art, comprises an output circuit for supplying a current to the coil; a constant current source; a capacitor means which is charged by a current supplied from said constant current source; and a pulse signal generating means for generating a pulse signal in synchronization with the rotation of a rotor of the motor, and further comprises: a first discharge means for discharging said capacitor means when receiving the pulse signal from said pulse signal generating means; a control circuit for deactivating said output circuit when the voltage level of said capacitor means is raised to said first predetermined level, and for activating said output circuit when the voltage level of said capacitor means is lowered to a second predetermined level, said second predetermined level being lower than said first predetermined level; a detecting means which is activated when the voltage level of said capacitor means is higher than a third predetermined level, said third predetermined level being higher than said first predetermined level; a circuit means which has a first state, and a second state, said circuit means changing its state from said first state to said second state when said detecting means is activated; and a second discharge means for discharging said capacitor means when said circuit means is in said second state.

In a preferred embodiment, the first discharge means comprises a transistor.

In a preferred embodiment, the second discharge means comprises two current mirror circuits.

In a preferred embodiment, the circuit means comprises a flip-flop circuit.

Thus, the invention described herein makes possible the objectives of (1) providing a device for preventing a coil of a brushless motor from burning in which the current capacity of a discharge means can be small; (2) providing a device for preventing a coil of a brushless motor from burning in which the level of charging current and discharging current can be abritrarily selected; (3) providing a device for preventing a coil of a brushless motor from burning which does not require a resistor of a high resistance value; (4) providing a device for preventing a coil of a brushless motor from burning which can be manufactured at a low cost; and (5) providing a device for preventing a coil of a brushless motor from burning which is reduced in size.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
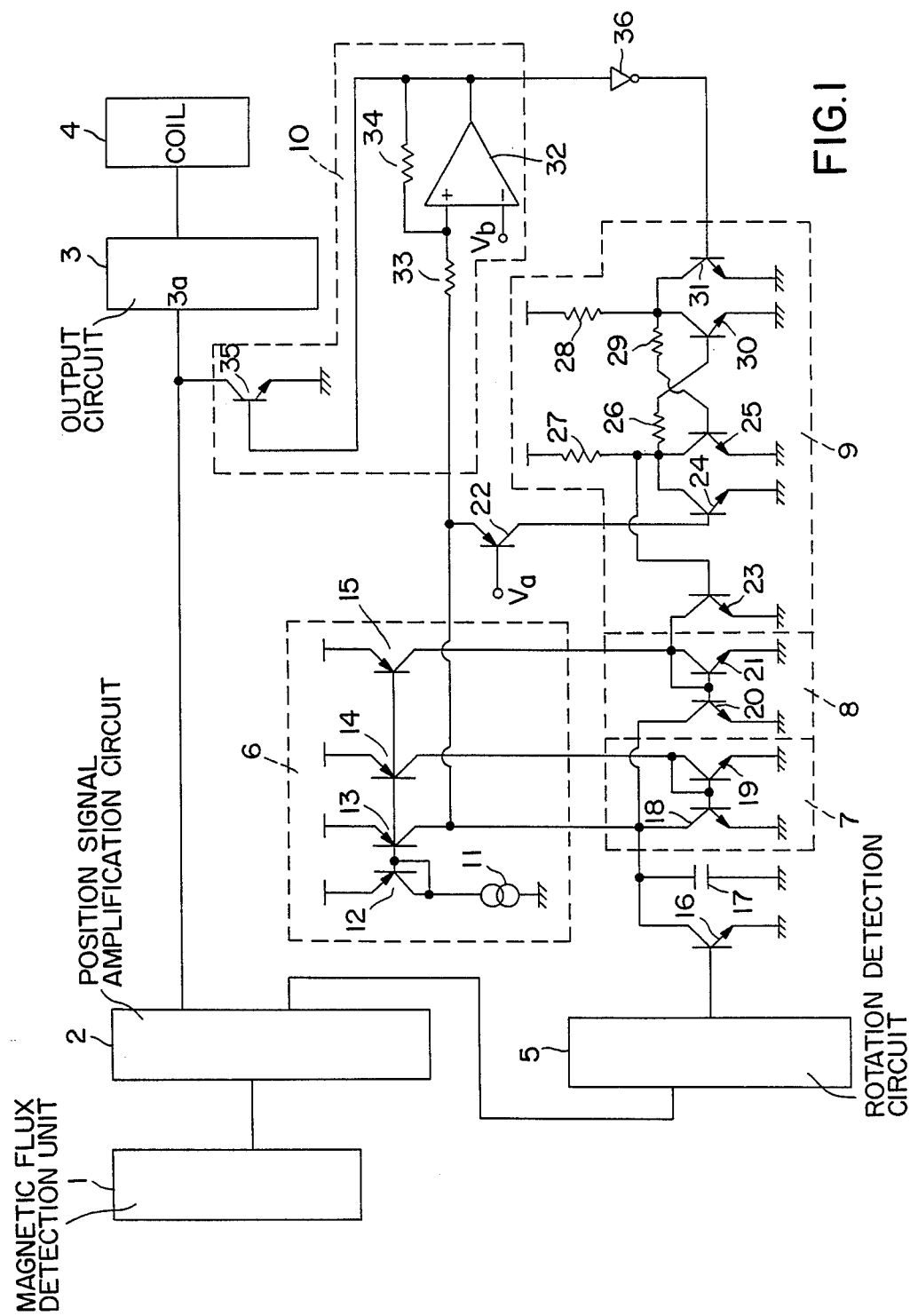
FIG. 1 is a circuit diagram of a device according to the invention.
Figure 3:
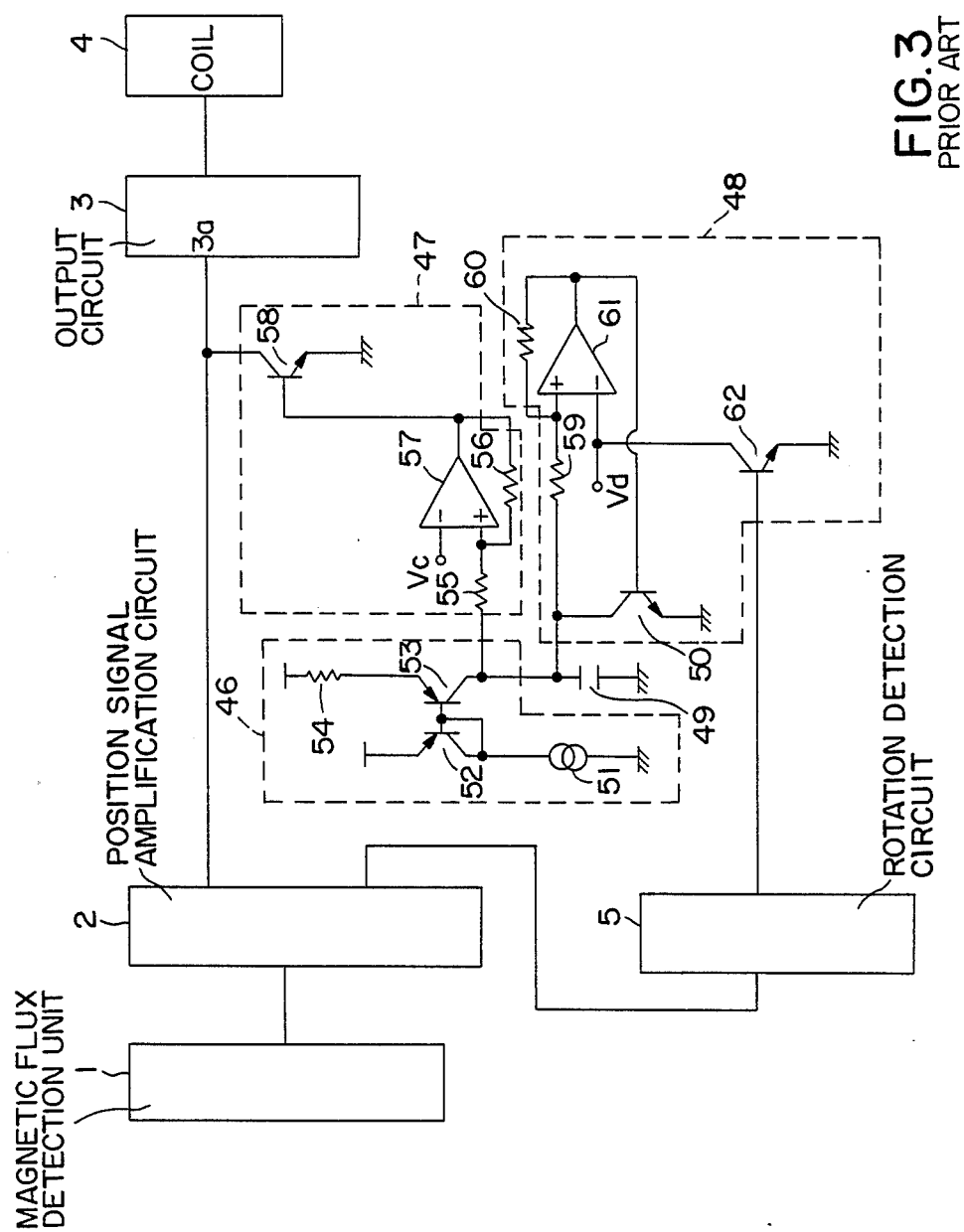
FIG. 3 is a circuit diagram of a conventional device.
Figure 4:
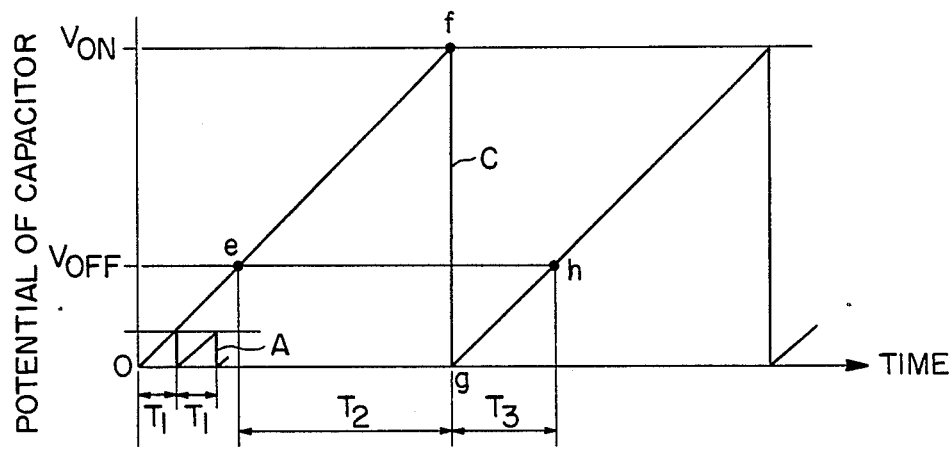
FIG. 4 is a graph illustrating potential changes of a capacitor used in the device of FIG. 3.
Figure 5:
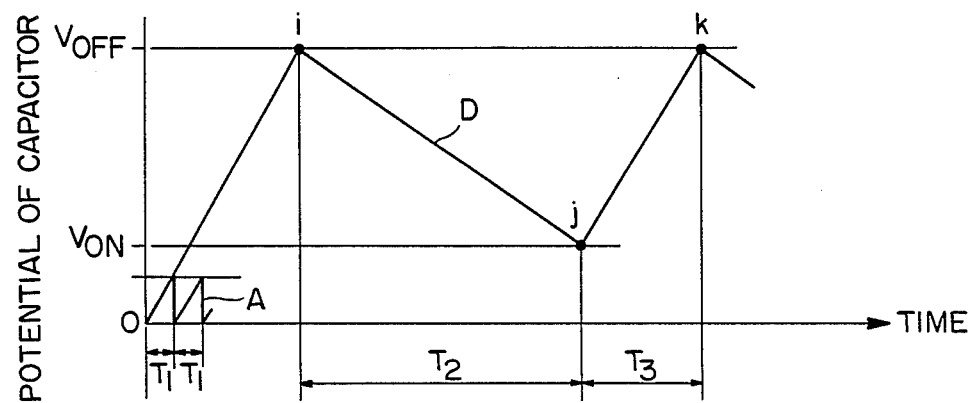
FIG. 5 is a graph illustrating potential changes of a capacitor used in an improved device.

FIG. 1 shows a device according to the invention. The device of FIG. 1 prevents a coil of a brushless motor from burning, and comprises a magnetic flux detection unit 1, a position signal amplification circuit 2, an output circuit 3, and a rotation detection circuit 5, as does the device of FIG. 3. These components may operate in the same manner as those of the device of FIG. 3, and, therefore, their detailed description is omitted. The device further comprises a constant current circuit 6, a first current mirror circuit 7, a second current mirror circuit 8, a flip-flop circuit 9, a control circuit 10, a transistor 16, a capacitor 17, and another transistor 22.

The constant current circuit 6 is provided with a constant-current source 11, and transistors 12 to 15 which constitute a further current mirror circuit. The transistors 13, 14 and 15 are set so as to deliver currents of the same amount (in practice, it is not necessary that they are set in such a manner).

The first current mirror circuit 7 comprises two transistors 18 and 19 which supply currents slightly different from each other in a relationship of $I_{18} < I_{19}$. The collector of the transistor 18 is connected to the collector of the transistor 13, while the collector of the transistor 19 is connected to the collector of the transistor 14. The second current mirror circuit 8 comprises two transistors 20 and 21 which are set so as to supply currents in a relationship of $I_{20} \cong 2(I_{19} - I_{18})$. The collector of the transistor 20 is connected to the collector of the transistor 18, while the collector of the transistor 21 is connected to the collector of the transistor 15.

The flip-flop circuit 9 comprises resistors 26 to 29, transistors 25 and 30, a first input transistor 24, a second input transistor 31, and an output transistor 23. The collector of the output transistor 23 is connected to the collector of the transistor 21 of the second current mirror circuit 8. The base of the transistor 22 is connected to $V_a$, while its emitter and collector are connected to the collector of the transistor 13 and the base of the transistor 24, respectively. In this embodiment, $V_a$ equals the difference between a predetermined voltage level $V_H$ which is higher than $V_{OFF}$ and $V_{BE}$ ($V_a = V_H - V_{BE}$).

The control circuit 10 comprises a comparator 32 having hysteresis determined by resistors 33 and 34, and a transistor 35. The non-inverted input terminal of the comparator 32 is connected through the resistor 33 to the collector of the transistor 13, and the inverted terminal thereof is connected to $V_b$ which is higher than $V_{ON}$ and lower than $V_{OFF}$ ($V_{ON} < V_b < V_{OFF}$). The output of the comparator 32 is connected to the base of the transistor 35 and, through an inverter 36, to the base of the transistor 31 of the flip-flop circuit 9. The collector of the transistor 35 is connected to the line supplying input signal to the input 3a of the output circuit 3. The collector and base of the transistor 16 are connected to the capacitor 17 and the output of the rotation detection circuit 5, respectively.

Figure 2:
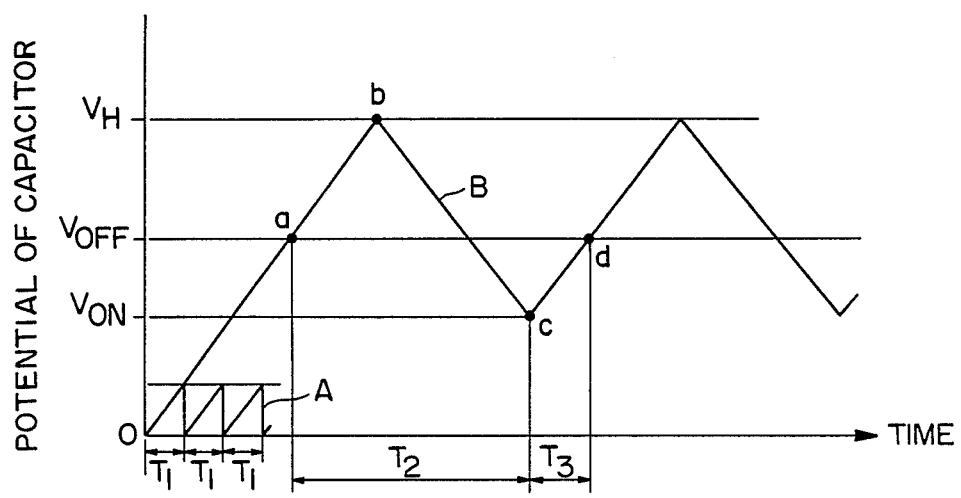
FIG. 2 is a graph illustrating potential changes of a capacitor used in the device of FIG. 1.

With reference to FIG. 2, the operation of the device of FIG. 1 will be described. When the rotor begins to turn, the transistor 22 is OFF so that the output of the comparator 32 is LOW, resulting in that the transistor 24 is OFF and the transistor 31 is ON. The transistor 23 is energized via the resistor 27, and draws the current from the transistor 15 to keep the second current mirror circuit 8 out of operation. The capacitor 17 is charged with the current ($I_{19}-I_{18}$), so that its potential rises. In a normal rotation of the motor, the rotation pulse signal is generated at intervals of $T_1$ (FIG. 2). In synchronization with the rotation pulse signal, the transistor 16 becomes ON to discharge the capacitor 17, thus preventing the potential of the capacitor 17 from further rising (curve A). This allows the normal rotation of the motor to continue.

When the motor stops due to an external cause, the potential of the capacitor 17 rises to reach a point a ($=V_{OFF}$). At this time, the output terminal of the comparator 32 goes HIGH to energize the transistor 35, so that the output circuit 3 is deenergised to prevent an overcurrent from flowing in the coil 4. The potential of the capacitor 17 further rises. When the potential reaches a point b, i.e. $V_H(=V_a+V_{BE})$, the transistor 22 is turned ON to make the transistor 24 ON, which turns OFF the transistor 23. This puts the second current mirror circuit 8 into operation to discharge the capacitor 17 with the 15 current of $-(I_{19}-I_{18})$. Then, the potential of the capacitor 17 drops. When the potential drops to a point c ($=V_{ON}$), the output of the comparator 32 goes LOW to turn OFF the transistor 35 and turn ON the transistor 31. This causes the output circuit 3 to be activated, and the flip-flop circuit 9 to invert the state. The coil 4 is energized again, and the transistor 23 is turned ON. When the transistor 23 is ON, the operation of the second current mirror circuit 8 halts. At this time, if the external cause has been removed, the rotation pulse signal is generated so that the capacitor 17 is discharged, and the motor returns to normal rotation. In contrast, if the external cause has not been removed, the above operation is repeated (curve B in FIG. 2).

As is apparent from the above description, the configuration of the present invention makes full use of the charge and discharge characteristics of the capacitor for effective use of the time constant, and employs a combination of a pair of current mirror circuits to enable charge and discharge currents to be set at desired values, thus eliminating the need for external parts such as high value resistors. Furthermore, the use of the detecting means and control circuit allows the capacitor to be discharged at a relatively low potential, resulting in that transistors of a large current capacity are not needed.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. In a device for preventing a coil of a brushless motor from burning, said device comprising: an output circuit for supplying current to the coil; a constant current source; a capacitor means which is charged by current supplied from said constant current source; and a pulse signal generating means for generating a pulse signal in synchronization with the rotation of a rotor of the motor, said device further comprises:
   a first discharge means for discharging said capacitor means when receiving the pulse signal from said pulse signal generating means;
   a control circuit for deactivating said output circuit when the voltage level of said capacitor means is raised to a first predetermined level, and for activating said output circuit when the voltage level of said capacitor means is lowered to a second predetermined level, said second predetermined level being lower than said first predetermined level;
   a detecting means which is activated when the voltage level of said capacitor means is higher than a third predetermined level, said third predetermined level being higher than said first predetermined level;
   a circuit means which has a first state, and a second state, said circuit means changing its state from said first state to said second state when said detecting means is activated; and
   a second discharge means for discharging said capacitor means when said circuit means is in said second state.

2. A device according to claim 1 wherein said first discharge means comprises a transistor.

3. A device according to claim 1 wherein said second discharge means comprises two current mirror circuits.

4. A device according to claim 1 wherein said circuit means comprises a flip-flop circuit.

* * * * *